July 3, 1945.　　　G. COLUCCI ET AL　　　2,379,682
MACHINE FOR CUTTING VENEER
Filed March 4, 1944
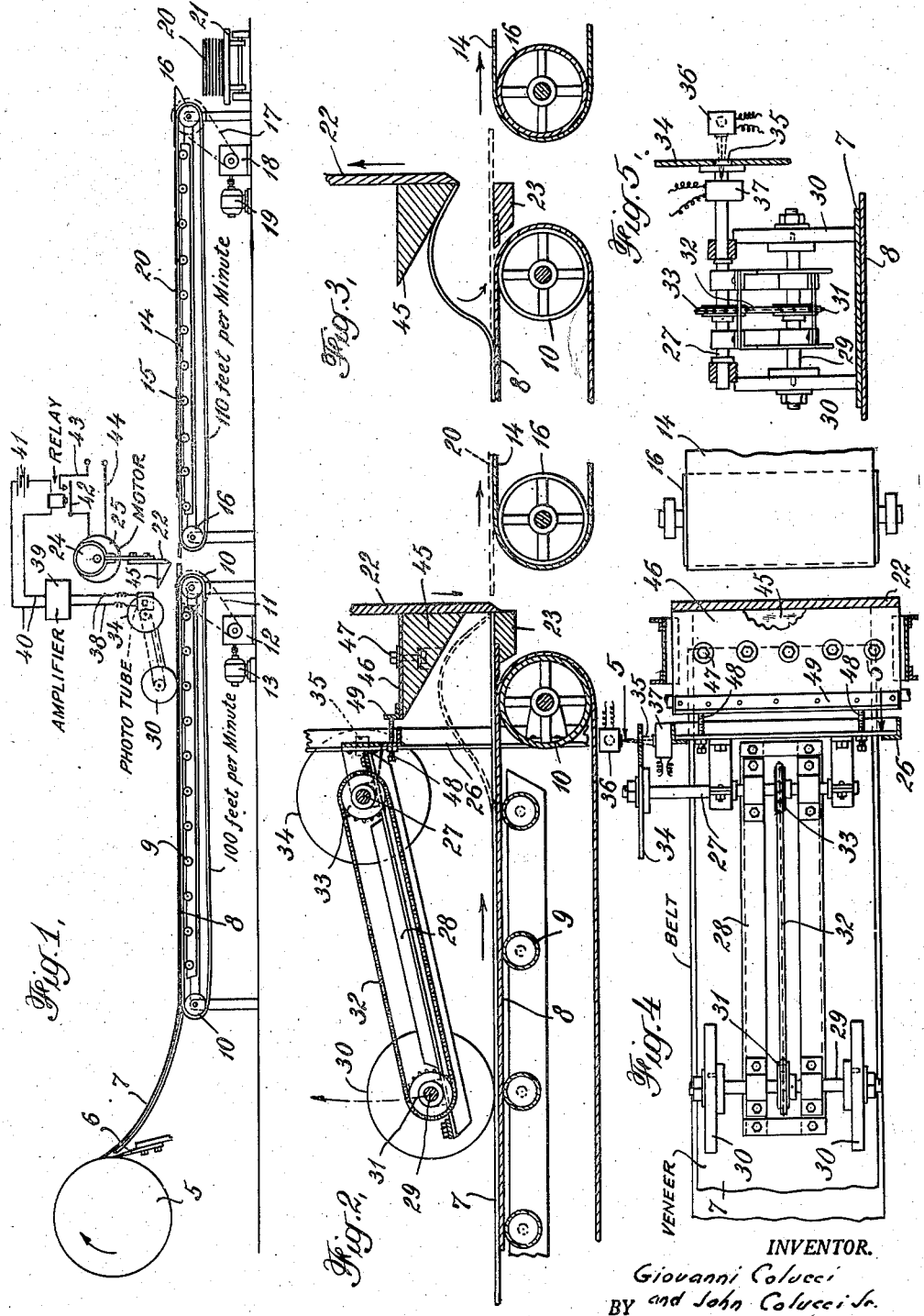
INVENTOR.
Giovanni Colucci
BY and John Colucci Jr.
ATTORNEYS Patented July 3, 1945

2,379,682

UNITED STATES PATENT OFFICE 2,379,682

MACHINE FOR CUTTING VENEER

Giovanni Colucci, Harbor Island, and John Colucci, Jr., Wilmington, N. C.

Application March 4, 1944, Serial No. 525,110

8 Claims. (Cl. 164—48)

This invention relates to machines for clipping veneer and more particularly to improvements therein whereby the strip of veneer as it is cut may be clipped into sheets of the desired width with clean squared edges.

In the production of veneer, it is cut from a log while the latter is rotated in a lathe. The veneer is delivered to a conveyor which supports the relatively fragile material. Division of the strip into sheets has been accomplished heretofore by manual operation of workmen stationed beside the conveyor. Considerable loss is sustained in this procedure because of the necessity for trimming the sheets to standard size. Attempts to perform the work mechanically have presented certain difficulties. One of the difficulties encountered is that the strip moves forwardly at a substantial rate and the forward edge tends to follow the upward movement of a mechanically operated knife after a sheet has been severed from the strip. The strip may curl instead of passing beneath the knife, thus preventing the successive severing of sheets therefrom.

It is the object of the invention to provide a simple and effective apparatus wherein the strip can be cut accurately into sheets of predetermined size.

Another object of the invention is the provision of means to ensure forward travel of the strip beneath the knife after each successive operation.

Other objects and advantages of the invention will be apparent as it is better understood by reference to the following specification and the accompanying drawing, in which Fig. 1 is a diagrammatic illustration of the apparatus for forming, conveying and cutting the strip;

Fig. 2 is a detail partially in section illustrating the operation;

Fig. 3 is a similar view showing a part of the mechanism of Fig. 2 and illustrating another phase of the operation;

Fig. 4 is a plan view partially in section of a portion of the machine; and

Fig. 5 is a section on the line 5—5 of Fig. 4.

Referring to the drawing, 5 indicates a log which is rotated clockwise in a lathe (not shown) and is engaged by a knife 6 which shaves a strip 7 of veneer from the log. The strip is delivered to a conveyor belt 8 which is supported on rollers 9 and pulleys 10. One of the pulleys 10 is driven by a belt 11 from a gear box 12 connected to a motor 13. The speed of the conveyor may be varied. It is operated preferably at a speed of 100 feet per minute or at the rate of formation of the veneer strip.

Spaced from the conveyor 8, a second conveyor 14 is supported on rollers 15 and pulleys 16. One of the pulleys is driven by a belt 17 connected to a gear box 18 and a motor 19. The conveyor 14 is preferably driven at a slightly higher rate, for example 110 feet per minute. It receives and delivers the sheets 20 as the latter are formed from the strip 7. The sheets may be accumulated on a truck or other conveying means 21.

For the purpose of severing the sheets 20 from the strip 7, a knife 22 is supported at the end of the conveyor 8 for co-operation with a shear block 23. The knife may be actuated through a cam 24 by a motor 25 when the latter is energized. When the knife descends, it shears the strip 7 transversely, thus dividing it into the desired sheets.

In order that the sheets may be of uniform length, I provide a supporting frame 26 above the end of the conveyor 8 with a shaft 27 extending through suitable bearings therein. A frame 28 is pivotally mounted on the shaft 27 and carries a transverse shaft 29 in suitable bearings to support measuring rolls 30 which rest upon the strip 7 as it passes over the conveyor 8. The measuring rolls 30 may be of a size such that the circumference is equal to the desired length of the sheets to be formed from the strip. Rolls of different sizes may be provided so that they may be substituted on the shaft 29 when sheets of different length are desired.

A sprocket 31 is secured to the shaft 29 and connected by a chain 32 to a sprocket 33 on the shaft 27. The sprockets 31 and 33 are of equal size so that regardless of the size of the rolls 30 each complete revolution thereof will cause a complete revolution of the shaft 27. The latter shaft carries a disc 34 having an opening 35 therein. At each complete revolution of the shaft 27, the opening 35 is interposed between a source of light 36 and an electric eye 37.

The light beam, which normally does not affect the electric eye 37, energizes it at each complete revolution of the disc 34.

The electric eye is connected by conductors 38 to an amplifier 39 which in turn is connected by conductors 40 through a source of current 41 to a relay 42. The relay is adapted to close a circuit through the conductors 43 and 44 from a source of current to the motor 25. The latter is energized, therefore, upon each complete revolution of the disc 34 whereby the knife 22 is moved to and from cutting position. The details of the electric eye, amplifier, relay and motor are all well known in the art and require no further description.

As previously indicated, one of the difficulties experienced in the attempt at mechanical cutting of veneer strips is due to the fact that the strip advances while the knife is in cutting position. It backs up against the knife as indicated in Fig. 2, and as the knife is lifted the end of the strip tends to follow the knife upwardly. Unless prevented, the strip will curl backwardly and will fail to pass beneath the knife for the successive cutting operation. To avoid this difficulty, I provide a transversely extending bar 45 which may be of wood or any other suitable material supported in any convenient manner so that it rests against the side of the knife from which the strip advances. It is so positioned that the knife will be raised above the lower edge of the bar when the knife is in its uppermost position. As the knife lifts the end of the strip, the latter will engage the bar and disengage the knife, whereupon the end will move forwardly to its normal position as indicated in dotted lines in Fig. 3. The end will advance then onto the conveyor 14 and in due course will be severed by the next descending movement of the knife to form a sheet of the desired dimensions.

Although the particular manner in which the bar 45 is mounted is unimportant, I find it to be desirable to provide for adjustment. For that purpose, the bar may be supported on a plate 46 extending transversely of the machine by bolts 47. The ends of the plates may be mounted in any suitable guideways. To permit adjustment, screws 48 are provided in the frame 26 and engage an angle bar 49 on the plate 46. Thus the bar 45 may be adjusted to close engagement with the knife 22 to ensure that the function of the bar 45 is performed accurately in its intended manner.

The apparatus as described has been utlized in the practical operation of cutting veneer strips into sheets. The sheets are accurately sized and the machine can be operated continuously without difficulty resulting from curling of the veneer strip behind the knife.

Various changes may be made in the structure as described and particularly in the details thereof without departing from the invention or sacrificing the advantages thereof.

We claim:

1. In an apparatus for cutting veneer from a traveling strip, a reciprocating knife adapted to engage and sever the strip at intervals, means to actuate the knife, means in advance of the knife constantly bearing against the advancing strip for initiating actuation of the actuating means for the knife after the passage of a predetermined length of strip therepast, and a bar associated with the knife on the side of the knife from which the strip advances to limit upward movement of the free end of the strip with the knife as the latter rises after the cutting operation.

2. In an apparatus for cutting veneer from a traveling strip, a reciprocating knife adapted to engage and sever the strip at intervals, a roller engaging the strip and rotated by passage of the strip therepast, means controlled by a predetermined rotation of the roller for actuating the knife, and a bar associated with the kife on the side of the knife from which the strip advances to limit upward movement of the free end of the strip with the knife as the latter rises after the cutting operation.

3. In an apparatus for cutting veneer from a traveling strip, a reciprocating knife adapted to engage and sever the strip at intervals, means controlled by the travel of the strip to actuate the knife, including rollers engaging the strip and a photoelectrically actuated relay adapted to be energized at each complete revolution of the rollers and a bar associated with the knife on the side of the knife from which the strip advances to limit upward movement of the free end of the strip with the knife as the latter rises after the cutting operation.

4. In an apparatus for cutting veneer from a traveling strip, a reciprocating knife adapted to engage and sever the strip at intervals, interchangeable rollers of different diameters engaging the strip and rotated by passage of the strip therepast, means controlled by a predetermined rotation of the rollers for actuating the knife and a bar associated with the knife on the side of the knife from which the strip advances to limit upward movement of the free end of the strip with the knife as the latter rises after the cutting operation.

5. In an apparatus for cutting veneer from a traveling strip, a reciprocating knife adapted to engage and sever the strip at intervals, means controlled by the travel of the strip to actuate the knife, including interchangeable rollers of different diameters engaging the strip and a photoelectrically actuated relay adapted to be energized at each complete revolution of the rollers and a bar associated with the knife on the side of the knife from which the strip advances to limit upward movement of the free end of the strip with the knife as the latter rises after the cutting operation.

6. In an apparatus for cutting veneer from a traveling strip, the combination of means for advancing the strip continuously, a reciprocating knife, motor means for actuating the knife, a measuring device adapted to engage the advancing strip and to control the actuation of the knife when a predetermined length of the strip has passed, and a bar associated with the knife on the side thereof from which the strip advances to prevent the free end of the strip from following the knife as it is lifted after the cutting operation.

7. In an apparatus for cutting veneer from a traveling strip, the combination of means for advancing the sheet continuously, a reciprocating knife, motor means for actuating the knife, a measuring device adapted to engage the advancing strip and to control the actuation of the knife when a predetermined length of the strip has passed, including a photoelectrically actuated relay, means controlled by the measuring device to energize the relay and an electric circuit to the motor means controlled by the relay, and a bar associated with the knife on the side thereof from which the strip advances to prevent the free end of the strip from following the knife as it is lifted after the cutting operation.

8. In an apparatus for cutting veneer from a traveling strip, the combination of means for advancing the strip continuously, a reciprocating knife, motor means for actuating the knife, a measuring device adapted to engage the advancing strip and to control the actuation of the knife when a predetermined length of the sheet has passed, including a photoelectrically actuated relay, means controlled by the measuring device to energize the relay and an electric circuit to the motor means controlled by the relay.

GIOVANNI COLUCCI.
JOHN COLUCCI, Jr.